United States Patent
Moody (10) Patent No.: US 9,401,071 B2
(45) Date of Patent: *Jul. 26, 2016

(54) CASINO GAME WITH PAY LINE MULTIPLIERS

(71) Applicant: IGT, Las Vegas, NV (US)

(72) Inventor: Ernest W. Moody, Las Vegas, NV (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/833,966

(22) Filed: Aug. 24, 2015

(65) Prior Publication Data

US 2015/0364005 A1    Dec. 17, 2015

Related U.S. Application Data

(63) Continuation of application No. 14/048,337, filed on Oct. 8, 2013, now Pat. No. 9,126,108, which is a continuation of application No. 13/479,338, filed on May 24, 2012, now Pat. No. 8,550,892, which is a continuation-in-part of application No. 13/442,058, filed on Apr. 9, 2012, now Pat. No. 9,017,159, which is a continuation of application No. 11/923,221, filed on Oct. 24, 2007, now Pat. No. 8,152,616.

(51) Int. Cl.
*G07F 17/32* (2006.01)
*A63F 13/00* (2014.01)
*A63F 1/00* (2006.01)

(52) U.S. Cl.
CPC .............. *G07F 17/3244* (2013.01); *A63F 1/00* (2013.01); *A63F 13/005* (2013.01); *G07F 17/32* (2013.01); *G07F 17/3293* (2013.01)

(58) Field of Classification Search
CPC ........................................................ G07F 17/32
See application file for complete search history.

(56) References Cited

U.S. PATENT DOCUMENTS

| | | |
|---|---|---|
| 5,167,413 A | 12/1992 | Fulton |
| 5,251,897 A | 10/1993 | Fulton |
| 5,322,295 A | 6/1994 | Cabot et al. |
| 5,374,067 A | 12/1994 | Jones |
| 5,411,257 A | 5/1995 | Fulton |
| 5,431,408 A | 7/1995 | Adams |
| 5,437,451 A | 8/1995 | Fulton |
| 5,531,448 A | 7/1996 | Moody |
| 5,636,842 A | 6/1997 | Cabot et al. |
| 5,732,950 A | 3/1998 | Moody |
| 5,755,621 A | 5/1998 | Marks et al. |
| 5,803,809 A | 9/1998 | Yoseloff |
| 5,820,460 A | 10/1998 | Fulton |
| 5,823,873 A | 10/1998 | Moody |
| 5,833,536 A | 11/1998 | Davids et al. |
| 5,833,537 A | 11/1998 | Barrie |

(Continued)

*Primary Examiner* — Omkar Deodhar
(74) *Attorney, Agent, or Firm* — Neal, Gerber & Eisenberg LLP (57) ABSTRACT

A poker machine apparatus has a pay line multiplier that is randomly selected for each active pay line. The pay line multiplier varies for each round of play. An extra wager may be required from the player to activate this feature during the play of a casino game. A player makes a wager to activate at least two pay lines to be played in the casino game. For each active pay line, a multiplier is randomly selected from a group of various multipliers and the selected multiplier is assigned to the activated pay line. The casino game is then played to achieve an outcome on each pay line. Each pay line that has a winning outcome has any associated award increased by the multiplier for that pay line.

20 Claims, 10 Drawing Sheets

(56) References Cited

U.S. PATENT DOCUMENTS

| | | |
|---|---|---|
| 5,873,823 A | 2/1999 | Eidelberg et al. |
| 5,882,259 A | 3/1999 | Holmes, Jr. et al. |
| 5,911,418 A | 6/1999 | Adams |
| 5,954,335 A | 9/1999 | Moody |
| 5,957,774 A | 9/1999 | Holmes, Jr. et al. |
| 6,007,066 A | 12/1999 | Moody |
| 6,050,568 A | 4/2000 | Hachquet |
| 6,062,979 A | 5/2000 | Inoue |
| 6,098,985 A | 8/2000 | Moody |
| 6,120,378 A | 9/2000 | Moody et al. |
| 6,149,521 A | 11/2000 | Sanduski |
| 6,176,781 B1 | 1/2001 | Walker et al. |
| 6,179,711 B1 | 1/2001 | Yoseloff |
| 6,193,235 B1 | 2/2001 | Vancura et al. |
| 6,196,547 B1 | 3/2001 | Pascal et al. |
| 6,213,877 B1 | 4/2001 | Walker et al. |
| 6,248,016 B1 | 6/2001 | Walker et al. |
| 6,257,979 B1 | 7/2001 | Walker et al. |
| 6,311,978 B1 | 11/2001 | Moody |
| 6,328,649 B1 | 12/2001 | Randall et al. |
| 6,334,613 B1 | 1/2002 | Yoseloff |
| 6,406,023 B1 | 6/2002 | Rowe |
| 6,419,578 B1 | 7/2002 | Moody et al. |
| 6,422,940 B1 | 7/2002 | Walker et al. |
| 6,474,645 B2 | 11/2002 | Tarantino |
| 6,517,074 B1 | 2/2003 | Moody et al. |
| 6,523,829 B1 | 2/2003 | Walker et al. |
| 6,561,898 B2 | 5/2003 | Moody |
| 6,561,904 B2 | 5/2003 | Locke et al. |
| 6,568,680 B1 | 5/2003 | Moody et al. |
| 6,569,013 B1 | 5/2003 | Taylor |
| 6,612,927 B1 | 9/2003 | Slomiany et al. |
| 6,652,377 B1 | 11/2003 | Moody |
| 6,672,959 B2 | 1/2004 | Moody et al. |
| 6,726,427 B2 | 4/2004 | Jarvis et al. |
| 6,729,961 B1 | 5/2004 | Millerschone |
| 6,916,245 B1 | 7/2005 | Vancura et al. |
| 6,935,950 B2 | 8/2005 | Tarantino |
| 6,955,356 B2 | 10/2005 | Moody |
| 6,964,418 B2 | 11/2005 | Moody |
| 6,991,538 B2 | 1/2006 | Cannon |
| 6,994,624 B2 | 2/2006 | Gold et al. |
| 7,056,207 B2 | 6/2006 | Walker et al. |
| 7,059,965 B2 | 6/2006 | Jackson |
| 7,137,628 B2 | 11/2006 | Moody |
| 7,156,397 B2 | 1/2007 | Moody et al. |
| 7,156,734 B1 | 1/2007 | Walker et al. |
| 7,201,655 B2 | 4/2007 | Walker et al. |
| 7,222,857 B2 | 5/2007 | Moody |
| 7,222,858 B2 | 5/2007 | Moody |
| 7,247,092 B2 | 7/2007 | Jarvis et al. |
| 7,250,001 B2 | 7/2007 | Baerlocher et al. |
| 7,258,611 B2 | 8/2007 | Bigelow, Jr. et al. |
| 7,297,057 B2 | 11/2007 | Gerrard et al. |
| 7,306,518 B2 | 12/2007 | Hughs-Baird et al. |
| 7,331,863 B2 | 2/2008 | Baerlocher |
| 7,338,370 B2 | 3/2008 | Oles et al. |
| 7,354,344 B2 | 4/2008 | Paulsen et al. |
| 7,404,762 B2 | 7/2008 | Moody |
| 7,416,186 B2 | 8/2008 | Walker et al. |
| 7,419,162 B2 | 9/2008 | Lancaster et al. |
| 7,431,644 B2 | 10/2008 | Moody |
| 7,488,251 B2 | 2/2009 | Kaminkow |
| 7,524,243 B2 | 4/2009 | Bansemer et al. |
| 7,566,271 B2 | 7/2009 | Hostetler et al. |
| 7,614,946 B2 | 11/2009 | Nicely |
| 7,641,197 B2 | 1/2010 | Jackson |
| 7,658,672 B1 | 2/2010 | Wolf et al. |
| 7,666,083 B2 | 2/2010 | Baerlocher et al. |
| 7,748,714 B2 | 7/2010 | Nicely et al. |
| 7,749,059 B2 | 7/2010 | Tarantino |
| 7,771,274 B2 | 8/2010 | Walker et al. |
| 7,785,188 B2 | 8/2010 | Cannon |
| 7,803,041 B2 | 9/2010 | Gold et al. |
| 7,803,043 B2 | 9/2010 | Jackson |
| 7,815,500 B2 | 10/2010 | Montross et al. |
| 7,819,740 B2 | 10/2010 | Masci et al. |
| 7,837,545 B2 | 11/2010 | Blair, Jr. et al. |
| 7,857,693 B1 | 12/2010 | Johnson et al. |
| 7,867,073 B2 | 1/2011 | Walker et al. |
| 7,914,369 B2 | 3/2011 | Walker et al. |
| 7,918,724 B2 | 4/2011 | Walker et al. |
| 7,922,575 B2 | 4/2011 | Jankowski |
| 8,029,358 B2 | 10/2011 | Bigelow, Jr. et al. |
| 8,062,119 B2 | 11/2011 | Stern et al. |
| 8,083,578 B2 | 12/2011 | Jackson |
| 8,092,290 B2 | 1/2012 | Darby |
| 8,118,662 B2 | 2/2012 | Caputo et al. |
| 8,137,174 B2 | 3/2012 | Nicely et al. |
| 8,177,620 B2 | 5/2012 | Miles et al. |
| 8,235,780 B2 | 8/2012 | Nicely |
| 8,235,781 B2 | 8/2012 | Moody |
| 8,262,448 B2 | 9/2012 | Nicely et al. |
| 8,262,455 B2 | 9/2012 | Caputo et al. |
| 8,272,940 B2 | 9/2012 | Cuddy et al. |
| 8,277,305 B2 | 10/2012 | Caputo et al. |
| 8,353,751 B2 | 1/2013 | Bickley et al. |
| 8,408,984 B2 | 4/2013 | Walker et al. |
| 8,434,764 B2 | 5/2013 | Walker et al. |
| 8,444,465 B2 | 5/2013 | Macaulay |
| 8,449,362 B2 | 5/2013 | Jackson |
| 8,460,094 B2 | 6/2013 | Bigelow, Jr. et al. |
| 2003/0216165 A1 | 11/2003 | Singer et al. |
| 2004/0053672 A1 | 3/2004 | Baerlocher |
| 2004/0152498 A1 | 8/2004 | Kaminkow et al. |
| 2005/0170876 A1 | 8/2005 | Masci et al. |
| 2006/0194628 A1 | 8/2006 | Novellie |
| 2008/0111309 A1 | 5/2008 | Nicely et al. |
| 2010/0004051 A1 | 1/2010 | Walker et al. |
| 2011/0014963 A1 | 1/2011 | Walker et al. |
| 2012/0129589 A1 | 5/2012 | Caputo et al. |

CASINO GAME WITH PAY LINE MULTIPLIERS

PRIORITY CLAIM

This application is a continuation of, and claims priority to and the benefit of, U.S. patent application Ser. No. 14/048,337, filed on Oct. 8, 2013, which is a continuation of, and claims priority to and the benefit of, U.S. patent application Ser. No. 13/479,338, filed on May 24, 2012, which issued as U.S. Pat. No. 8,550,892 on Oct. 8, 2013, which is a continuation-in-part of, and claims priority to and the benefit of, U.S. patent application Ser. No. 13/442,058, filed on Apr. 9, 2012, which issued as U.S. Pat. No. 9,017,159 on Apr. 28, 2015, which is a continuation of, and claims priority to and the benefit of, U.S. patent application No. 11/923,221, filed on Oct. 24, 2007, which issued as U.S. Pat. No. 8,152,616 on Apr. 10, 2012, the entire contents of each of which are incorporated herein by reference.

BACKGROUND OF THE INVENTION

These inventions relate primarily to casino games, and more particularly to casino games such as video poker and slot machines The present inventions use a randomly determined multiplier feature which is applied to each pay line of the casino game.

There are numerous casino games that utilize pay lines which designate the grouping of symbols that must form a winning combination in order for a player to receive a payout for his wager. One casino game that uses multiple pay lines is multiple hand video poker. Many slot machine games also use multiple pay lines.

Conventional video draw poker is a single player game in which the player does not play against a dealer or other players, but rather merely tries to achieve the highest possible poker hand ranking.

One of the most common variations of video draw poker is Five Card Draw poker. In general, in Five Card Draw poker, a player receives an initial hand of five cards dealt from a fifty-two card standard deck of playing cards. A standard deck of playing cards has four suits: Spades, Hearts, Diamonds and Clubs; and each suit has thirteen ranks: Deuce, Three, Four, Five, Six, Seven, Eight, Nine, Ten, Jack, Queen, King, and Ace, in order from lowest to highest.

The deck of playing cards is shuffled and an initial hand of five cards is dealt to a player. Once the initial hand is dealt to the player, the player can discard none, one, a plurality, or all of the five cards of the initial hand. Each discarded card is replaced with another card from the remaining cards of the deck. After the replacement cards are dealt to the player's hand, the player then has a final hand and the five cards of the final hand are evaluated to determine if there is a winning combination. Poker hand rankings are generally used as the criteria for determining winning combinations.

The conventional winning poker hand rankings that are used in video poker in order from highest to lowest category are: Royal Flush, Straight Flush, Four of a Kind, Full House, Flush, Straight, Three of a Kind, Two Pair and a Pair of Jacks or better. Any hand having less than a Pair of Jacks or better is usually a losing hand. Within each poker hand ranking category, hands are ranked according to the rank of individual cards, with an Ace being the highest card and a Deuce being the lowest card. There is no difference in poker hand ranking between the four suits of cards.

A payout schedule or pay table is used to determine the amount awarded to the player for achieving a winning combination based on the amount wagered by the player.

Any suitable pay table can be used, and a typical pay table for a Jacks or Better Draw poker format return would be:

TABLE 1

| JACKS OR BETTER DRAW POKER | NUMBER OF COINS BET | | | | |
|---|---|---|---|---|---|
| POKER HAND CATEGORY | 1 | 2 | 3 | 4 | 5 |
| ROYAL FLUSH | 250 | 500 | 750 | 1000 | 4000 |
| STRAIGHT FLUSH | 50 | 100 | 150 | 200 | 250 |
| FOUR-OF-A-KIND | 25 | 50 | 75 | 100 | 125 |
| FULL HOUSE | 8 | 16 | 24 | 32 | 40 |
| FLUSH | 6 | 12 | 18 | 24 | 30 |
| STRAIGHT | 4 | 8 | 12 | 16 | 20 |
| THREE-OF-A-KIND | 3 | 6 | 9 | 12 | 15 |
| TWO PAIR | 2 | 4 | 6 | 8 | 10 |
| JACKS OR BETTER | 1 | 2 | 3 | 4 | 5 |

These winning poker hand rankings are used in the Jacks or Better draw poker format as well as many of the other draw poker formats. Most of the more recent modifications to video draw poker involve the use of different draw poker formats such as Bonus Poker, Double Bonus Poker, Double-Double Bonus Poker and even Triple Bonus Poker. Different draw poker formats involve changes to the pay table and often involve using different poker hand rankings as winning hand combinations.

Other variations of draw poker exist which use jokers or wild cards, such as Deuces Wild poker and Jokers Wild poker. In Deuces Wild poker, any deuce in a player's hand functions as a wild card. Typically in Jokers Wild poker, when one or more jokers are added to a fifty-two card deck of cards, each joker also acts as a wild card.

In typical video draw poker games, a player receives five cards from a virtual standard deck of playing cards to form an initial player hand. The virtual deck of playing card replicates a traditional fifty-two card deck of playing cards. The player is able to discard none, one, some or all of the cards and the replacement cards for the discarded cards are drawn and displayed from the remaining cards of the virtual deck of cards. In a five card draw poker game, a player selects a hold input associated with a particular card to signify that they would like to keep that card. Any cards that are upheld are discarded. The discarded cards are replaced with cards from the remaining cards in the virtual deck to form the final player hand. The final player hand is compared to a pay table and the gaming system provides awards for a winning final hand based on the poker hand ranking of the player's final hand and the amount wagered.

Numerous variations of poker exist, including Five Card Draw poker, Five Card Stud poker, Seven Card Stud poker, Hold 'Em poker (also called Texas Hold 'Em poker), Omaha poker (also called Omaha Hold 'Em poker), and Pai-Gow poker. The variations in these games generally differ in the manner in which cards are dealt and in the manner and frequency in which bets are placed. The number of cards dealt and the ability to draw or replace cards depends on the particular variation of poker being played. Various criteria may also be used to determine the winning hand, including highest ranking hand, lowest ranking hand (Lo-Ball), and those games in which the high and low hands each win half of the pot (High-Low).

Many video poker gaming machines are provided with a menu so that the player can indicate his choice of the poker game format that the player wishes to play and the player then makes his wager based on upon that choice of poker game format. Each poker format has its own pay table associated therewith.

Newer video poker gaming machines allow the player to play multiple hands of video poker at the same time. Each hand of a multiple hand game of video poker is treated as a separate pay line. For example, U.S. Pat. No. 5,823,873 (Moody) (the disclosure of which is incorporated herein by this reference) describes a video gaming machine and method in which the player may play multiple hands at the same time. The player makes a wager for each separate hand to be played by the player. A first initial hand of five cards is dealt all face up. The player selects none, one, a plurality or all of the face up cards from the first hand as cards to be held. The cards that are held are reused from the first hand into all of the other hands. Replacement cards for the non-selected cards are dealt into the first hand so that the first hand has five cards. Additional cards are also dealt to all of the other hands so that each hand is a final five card hand. The poker hand ranking of each final five card hand is determined. The player is then paid for any winning poker hands based on a pay table and the amount of the player's wager.

U.S. Pat. No. 6,955,356 (Moody) (the disclosure of which is incorporated herein by this reference) also discloses and claims many variations of multiple hand video poker including multiple hands played at the same time and multiple hands played seriatim. Five cards initial poker hands are disclosed as well as less than five card initial poker hands. Multiple initial hands in which all of the cards are dealt face up and which some of the cards are dealt face up and the other cards dealt face down are also disclosed.

Another method of playing multiple hand video poker is described in U.S. Pat. No. 6,050,568 (Hachquet) (the disclosure of which is incorporated herein). In this method, two or more identical starting hands are displayed to the player. The player has the option of holding and discarding from each of these hands independently. The player is not required to hold the same cards in each hand. After the player has selected which cards to hold in each hand, replacement cards are displayed for the upheld cards and the poker hand ranking of each final hand is determined. Winning poker hand combinations are paid in accordance with a pay table and the amount wagered by the player.

U.S. Pat. No. 6,517,074 (Moody et al.), the disclosure of which is incorporated herein, also discloses a method of playing multiple hand video poker in which each hand is played independently of the other hands.

U.S. Pat. No. 6,149,521 to Sanduski, the disclosure of which is incorporated herein, discloses randomly applying a multiplier to a pay line based on the value of a multiplier card. Sanduski discloses using only a single multiplier value for a single hand of video poker. For example, when a player achieves a Four-of-a-Kind, the payout for this winning combination is multiplied by the value of the kicker card in the poker hand.

U.S. Pat. No. 7,247,092 to Jarvis et al., the disclosure of which is incorporated herein, discloses the use of one or more multiplier cards added to a conventional deck of playing cards. Whenever a multiplier card appears during the play of a video poker game, the payout for any winning combination that is achieved is multiplier by the value of the multiplier card. This Jarvis feature has been commercialized in a game known as SUPER TIMES PAY which is marketed by IGT of Reno, Nev.

The Jarvis multiplier card feature has been applied to multiple hand video poker. For example, in TRIPLE PLAY SUPER TIMES PAY which is marketed by IGT of Reno, Nev., all pay lines are eligible for the same multiplier value should a multiplier card appear in the initial deal of the starting hand.

Slot machines also have one or more pay lines and for each pay line that has been activated by making a wager thereon, a player receives a payout whenever a winning symbol combination that appears on an active pay line.

U.S. Pat. No. 6,120,378 to Moody, the disclosure of which is incorporated herein, discloses a multiple reel slot machine with multiple pay lines. The player makes a wager for each pay line that the player wishes to have activated for a particular round of play. The methods of the present invention may be practiced using the slot machine disclosed in this '378 patent as well as other slot machines which have multiple pay lines.

The present invention provides a method for applying separate multipliers to each pay line thereby adding a new and exciting wagering and winning feature for the player.

SUMMARY

A pay line multiplier is randomly selected for each active pay line. The pay line multiplier varies for each round of play. An extra wager may be required from the player to activate this feature during the play of a casino game.

A player makes a wager to activate at least two pay lines to be played in the casino game. For each active pay line, a multiplier is randomly selected a multiplier from a group of various multipliers and the selected multiplier is assigned to the activated pay line.

The casino game is then played to achieve an outcome on each pay line. Each pay line that has a winning outcome has any associated award increased by the multiplier for that pay line.

DETAILED DESCRIPTION OF THE PREFERRED EMBODIMENTS

Figure 1:
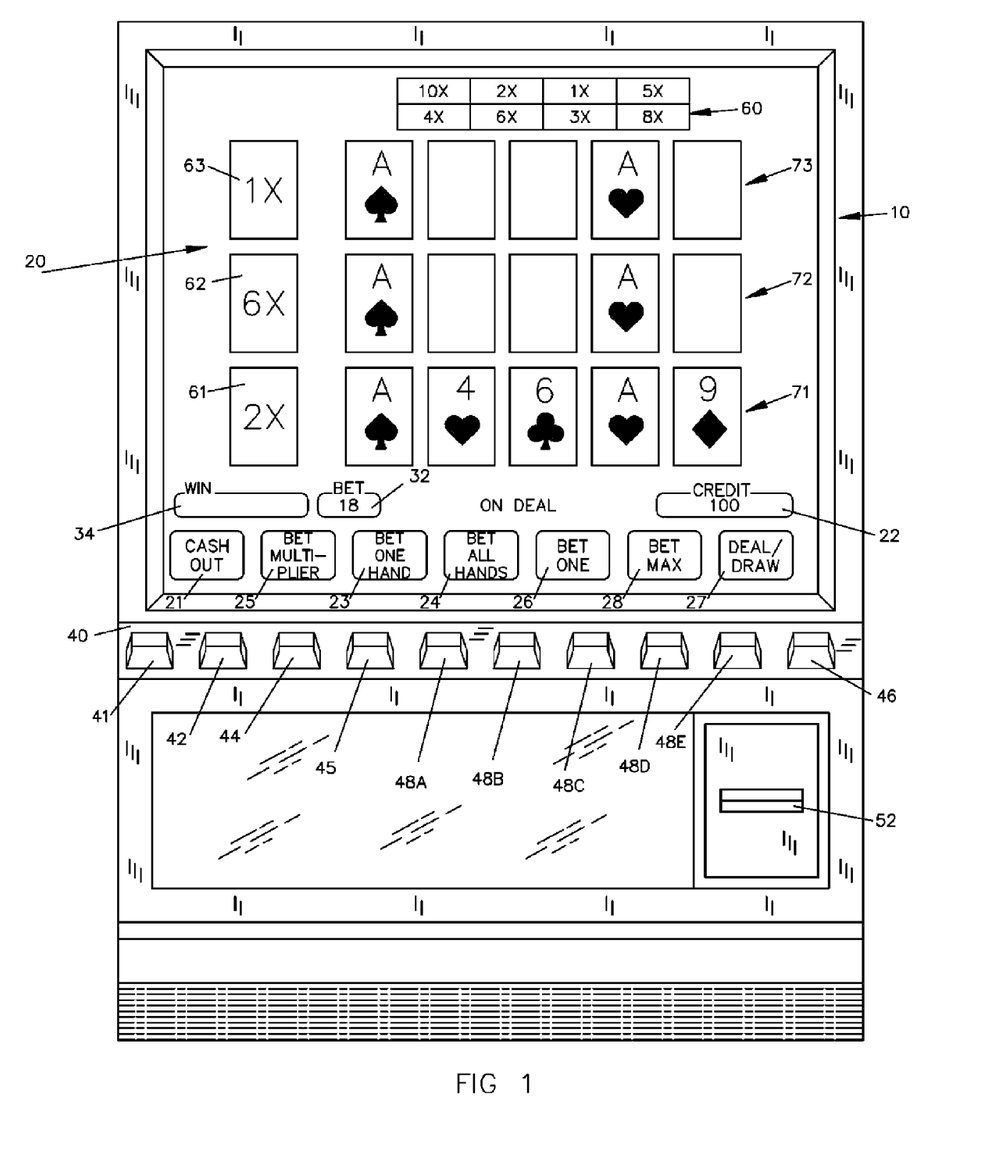
FIG. 1 shows a video poker machine configured to practice Version 1 of the present invention showing a representative initial deal of the cards of a multiple hand poker game.

The present invention relates to casino games such as video poker games and slot machines FIG. 1 shows generally at 10 a typical electronic video poker machine that is configured to provide to the player the method of the present invention. A portion of the poker machine 10 includes a conventional video screen display 20 upon which the play of the poker game is shown.

The poker machine 10 also includes a conventional currency/ticket acceptor 52 by which the player can insert currency or tickets to add credits to a credit meter 22. It is also possible to provide a conventional coin head (not shown) to allow the player to add credits or make wagers by using coins or gaming tokens.

As is also conventional in electronic video poker machines, the credit meter 22 is provided to show the amount of credits that the player has accrued on the gaming machine 10—either by inserting coins, tokens, currency or tickets or from winning plays achieved by the player. Whenever the player makes a wager, the amount of the wager is decremented from the credit meter 22. Whenever the player achieves a winning play during the play of the game, the amount of the winning play is incremented on the credit meter 22.

A conventional payout hopper may also be located on the interior of the gaming machine and is used to dispense coins or tokens to the player into a payout tray (not shown) when the player wishes to collect any winning amounts the player has accrued. Other suitable and conventional payout mechanisms can be used, such as a ticket printer or other cashless payout devices.

A button panel 40 is also provided on the poker machine 10 and the buttons mounted on the button panel 40 are used by the player to control the operation of the poker machine 10. Any suitable configuration of the buttons on the button panel can be used and, alternatively, conventional touch screen technology can be used for any or all of the buttons mounted on the button panel.

A typical button arrangement is shown on the button panel 40 in FIG. 1. A "BET ONE" button 42 is provided to allow the player to wager one credit at a time. A "BET MAX" button 44 is provided to allow the player to wager the maximum amount of credits permitted by the configuration of the gaming machine 10. Any number of credits can be set as the maximum amount that it is possible to wager on each hand and, typically, five credits will be the maximum number of credits for any particular hand. Alternatively, a "BET ONE" location 26 and a "BET MAX" location 28 can be provided on the video screen 20 to allow the player to wager by using conventional touch screen technology.

The button panel 40 also includes a "CASH OUT" button 41 by which the player can effect the cashing out of any credits accrued on the credit meter 22. A touch screen "CASH OUT" location 21 may also be provided.

A conventional "DEAL/DRAW" button 46 is also provided on the button panel 40 which is used by the player to activate the initial deal of the cards at the deal stage of the method of play or the dealing of replacement cards at the draw stage of the method of play as is appropriate. Similarly, a DEAL/DRAW location 27 can be provided on the video screen 20 to allow the player to effect either the deal step or the draw step by using conventional touch screen technology.

The button panel 40 is also provided with five "CARD" buttons 48A, 48B, 48C, 48D and 48E associated with each horizontal card location on the video screen display: card button 48A is associated with the left most card location, card button 48B is associated with the second from the left card location, card button 48C is associated with the middle card location, card button 48D is associated with the second from the right card location and card button 48E is associated with the right most card location. Each card button is preferably aligned below the card locations so that the player can easily associate the appropriate card button with the appropriate card location. These card locations 48 are used by the player to select which cards to hold during the draw step of the poker game. Alternatively, the card locations on the video screen display 20 can be touch screen activated to allow the play to select which cards to hold by merely touching the card location on the video screen display 20.

A "BET ONE HAND" touch screen location 23 is provided on the video screen display 20 to allow the player to choose to play one hand of video poker. Each time the player presses the "BET ONE HAND" touch screen location 23 another hand of video poker is activated for that round of play. A "BET ALL HANDS" touch screen location 24 is also provided on the video screen display 20 to allow the play to activate all available hands of the multiple hand poker game with a single press. Associated buttons (not shown) may be provided on the button panel 40 to allow the player to bet one hand or to bet all hands.

The button panel 40 also includes a "BET MULTIPLIER" button 45 and an associated "BET MULTIPLIER" touch screen location 25 can be provided on the video screen display 20. This allows the player to activate the multiplier feature of the present invention during the play of the video poker game, if the use of the multiplier feature is optional during the play.

The video screen display 20 also has a "BET" location 32 that shows the amount of credits that have been wagered on a particular round of play and a "WIN" location 34 that shows the amount of credits won by the player on a particular round of play.

Version 1

The method of Version 1 of the present invention will now be described.

After the player has inserted an appropriate amount of coins, tokens, currency or tickets to add a sufficient amount of credits on the credit display meter 22, the player makes his initial wager. The player may press the "BET ONE" button 42 one or more times to bet in single increments or the player may merely press the "BET MAX" button 44 and the maximum number of credits are applied, for example, five credits would be wagered. The player can also use the touch screen locations to make his wager as described above.

As shown in FIG. 1, a player has made an eighteen credit wager shown in the "BET" location 32. This activates three pay lines: five credits are allocated as the amount wagered on each pay line and the sixth credit is required for the multiplier feature on each pay line. In the preferred embodiment of the present invention, a player must make an extra wager to be eligible for the multiplier feature. The amount of the extra wager relates to the frequency and amount of the multipliers applied to the various pay lines. Alternatively, no extra wager could be required for the multiplier feature, but the pay table would have to be adjusted for the increased payouts that would come from the multiplier feature.

A multiplier indicator 60 is provided on the video screen display 20. In a preferred embodiment of the present invention, an illuminating effect could randomly flash through the various multipliers show in the multiplier indicator 60 and wherever the illuminating effect stopped, that particular multiplier would be selected for an active pay line. Any other suitable multiplier random selection device could be used.

As shown in FIG. 1, a 2× multiplier 61 has been randomly selected for HAND 71, a 6× multiplier 62 has been randomly selected for HAND 72 and a 1× multiplier 63 has been randomly selected for HAND 73. The payouts for any winning card combinations that are achieved on each of these pay lines would be increased by the indicated multiplier.

The poker game shown in FIG. 1 as an example is a three hand poker game played in accordance with the method disclosed in U.S. Pat. No. 5,873,823. The player has been dealt a first HAND 71 of the Ace of Spades, Four of Hearts, Six of Clubs, Ace of Hearts and Nine of Diamonds. The player has selected to hold the Ace of Spades and the Ace of Hearts and these two cards are duplicated into second HAND 72 and third HAND 73.

Figure 2:
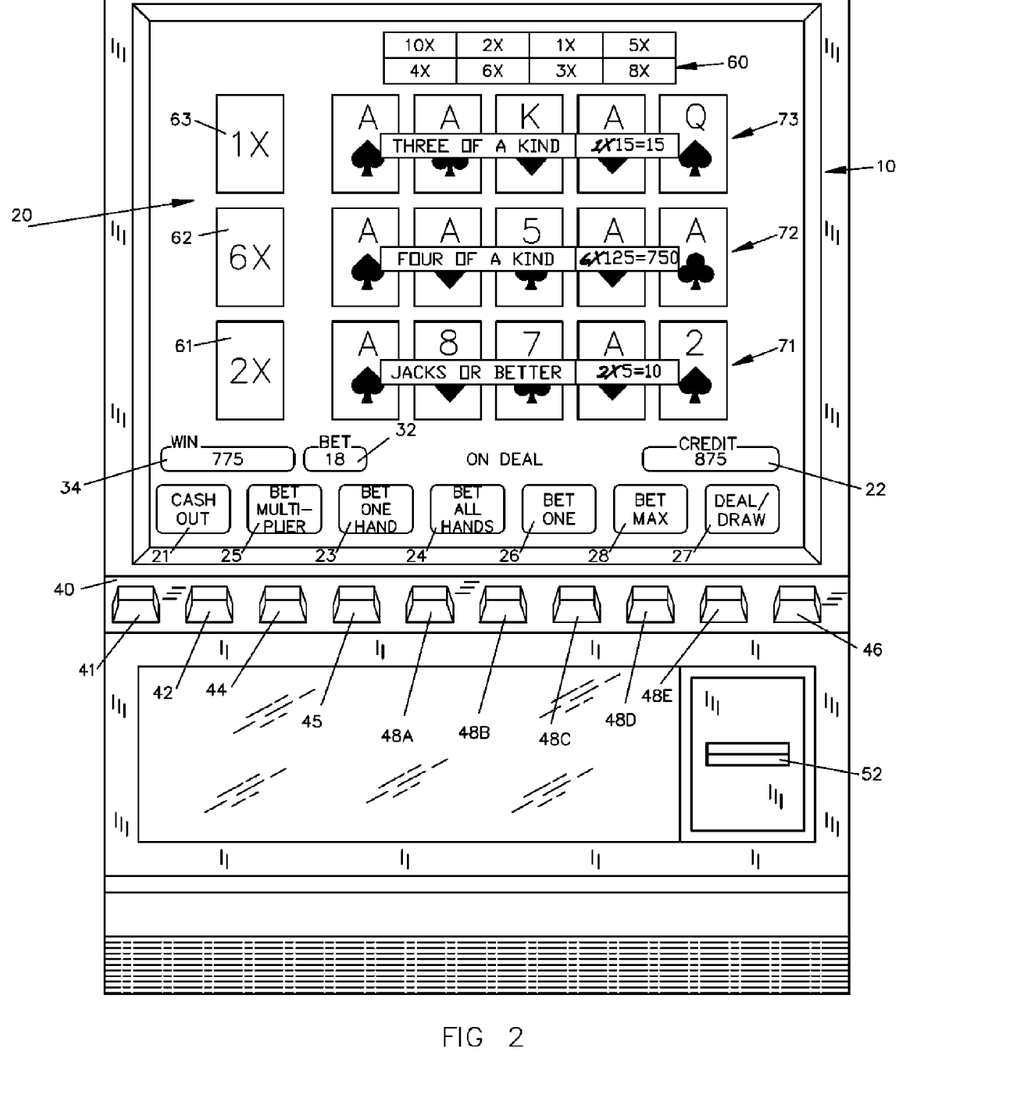
FIG. 2 shows a video poker machine configured to practice Version 1 of the present invention showing a representative display of the final hands of a multiple hand poker game.

As shown in FIG. 2, replacement cards for the discarded cards of first HAND 71 are displayed and the final first HAND 71 has a poker hand combination of a Pair of Aces. Additional cards are displayed into second HAND 72 and the final second HAND 72 has a poker hand combination of Four Aces. Additional cards are displayed into third HAND 73 and the final third HAND 73 has a poker hand combination of Three Aces.

In the example shown in FIGS. 1 and 2, a Jacks or Better draw poker game format is used. A suitable pay table for this format would be:

TABLE 1

| JACKS OR BETTER DRAW POKER | NUMBER OF COINS BET | | | | |
|---|---|---|---|---|---|
| POKER HAND CATEGORY | 1 | 2 | 3 | 4 | 5 |
| ROYAL FLUSH | 250 | 500 | 750 | 1000 | 4000 |
| STRAIGHT FLUSH | 50 | 100 | 150 | 200 | 250 |
| FOUR-OF-A-KIND | 25 | 50 | 75 | 100 | 125 |
| FULL HOUSE | 8 | 16 | 24 | 32 | 40 |
| FLUSH | 6 | 12 | 18 | 24 | 30 |
| STRAIGHT | 4 | 8 | 12 | 16 | 20 |
| THREE-OF-A-KIND | 3 | 6 | 9 | 12 | 15 |
| TWO PAIR | 2 | 4 | 6 | 8 | 10 |
| JACKS OR BETTER | 1 | 2 | 3 | 4 | 5 |

Using the pay table shown in Table 1, final HAND 71 is a winning combination of Jacks or Better and the player would receive ten credits as a payout based on the 2× multiplier 61. Final HAND 72 is a winning combination of Four-of-a-Kind and the player would receive seven hundred fifty credits as a payout based on the 6× multiplier 62. Final HAND 73 is a winning combination of Three-of-a-Kind and the player would receive fifteen credits as a payout based on the 1× multiplier 63.

While the example shown in FIGS. 1 and 2 uses a regular Jacks or Better draw poker format pay table, other pay tables have been developed for the other variations of draw poker, such as Deuces Wild Poker, Bonus Poker, Double Bonus Poker, Double Double Bonus Poker, Triple Bonus Poker, Joker's Wild Poker or any of the myriad of video poker formats that have been developed. Each of these video poker formats uses various arrangements of poker hand rankings as winning combinations and they use various payout amounts for the poker hand rankings. The amounts paid for the various winning hand combinations in each of the video poker formats are calculated to provide a certain theoretical game return based on the mathematical probability of achieving the winning hand combinations and the theoretical hold percentage that the casino wishes to offer to the players.

Figure 3:
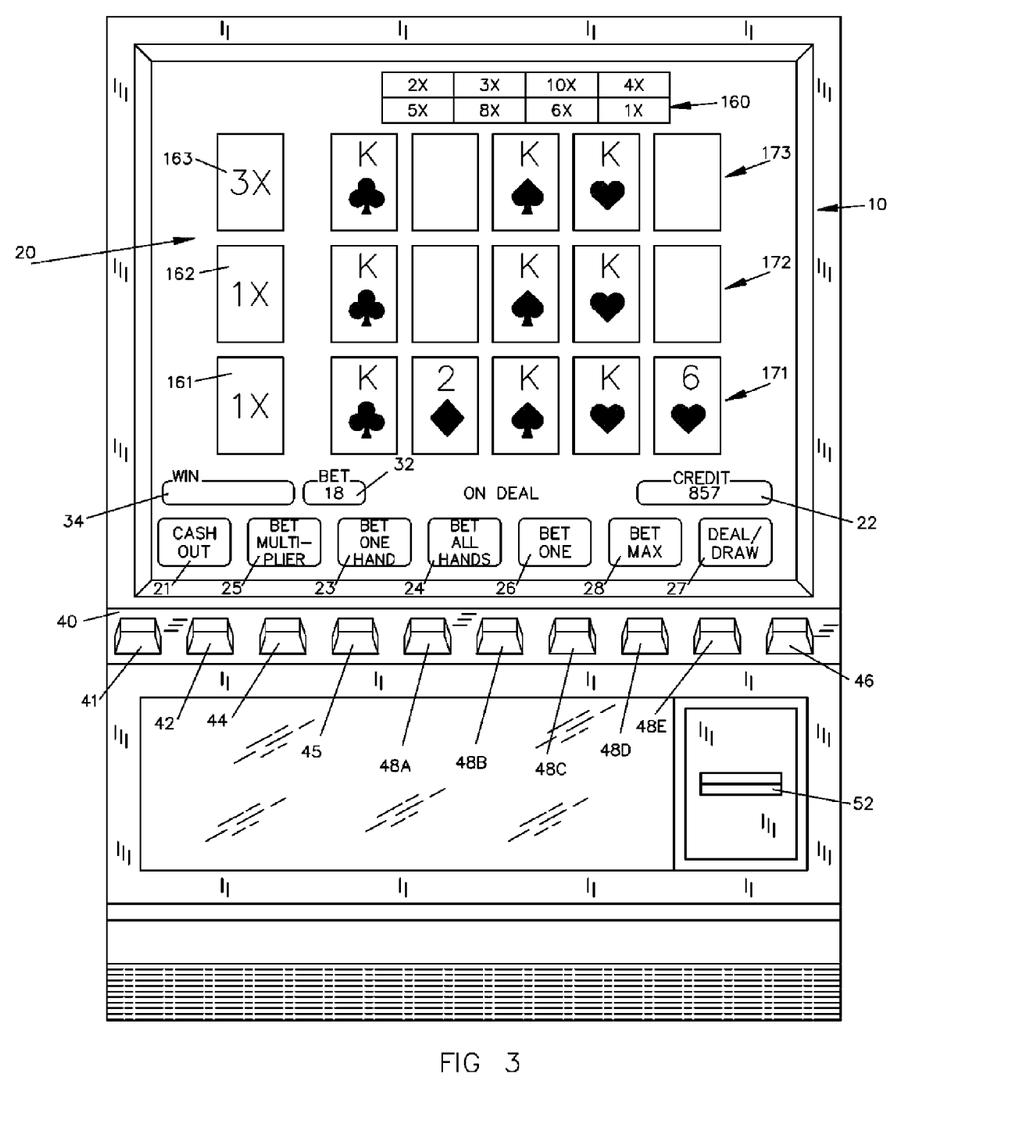
FIG. 3 shows a video poker machine configured to practice Version 1 of the present invention showing another representative initial deal of the cards of a multiple hand poker game.

FIG. 3 shows an example of another deal that could occur in the method of play of the present invention. The multiplier indicator 160 has a randomly rearranged order of the multipliers and a 1× multiplier 161 has been randomly selected for first HAND 171, a 1× multiplier has also been randomly selected for second HAND 172 and a 3× multiplier has been randomly selected for third HAND 173. Using the same three hand format described above, the player has been dealt three Kings in the first HAND 171 and the player has held these three Kings into the second HAND 172 and the third HAND 173. Any winning card combinations achieved after the card replacement step of the method would again have their respective payouts increased by the multiplier associated with each hand.

With regard to the following versions 2 through 4, the method of play applies to poker card games with multiple hands which correspond to multiple pay lines. The method uses a deck of playing cards. A pay table is provided which contains winning outcomes and awards associated with each winning outcome. A player makes a wager to activate at least a first pay line and at least a second pay line to be played in the poker card game. A first initial hand of cards is displayed face up corresponding to the first pay line.

If the first initial hand comprises a predetermined arrangement of cards, a multiplier is randomly selected from a group of various multipliers for each activated pay line and the selected multiplier is assigned to the activated pay line.

The player selects none, one or more of the face up cards from the first initial hand as cards to be held and the cards to be held, if any, are reused in a second initial hand corresponding to the second pay line. The cards that were not selected to be held are discarded from the first initial hand and replacement cards are displayed in the first initial hand for the discarded cards creating a first final hand. Additional cards, if necessary, are displayed into the second initial hand creating a second final hand, Next it is determined whether the outcome on each final hand pay line is a winning outcome and the player is provided with an award from the pay table for each pay line that has a winning outcome and the award is modified by the multiplier for that pay line.

Version 2

The method of Version 2 of the present invention will now be described. In this version, the predetermined arrangement of cards in the first initial hand must have a poker hand ranking of a Pair of Jacks or Better or higher to trigger the multiplier feature.

Figure 4:
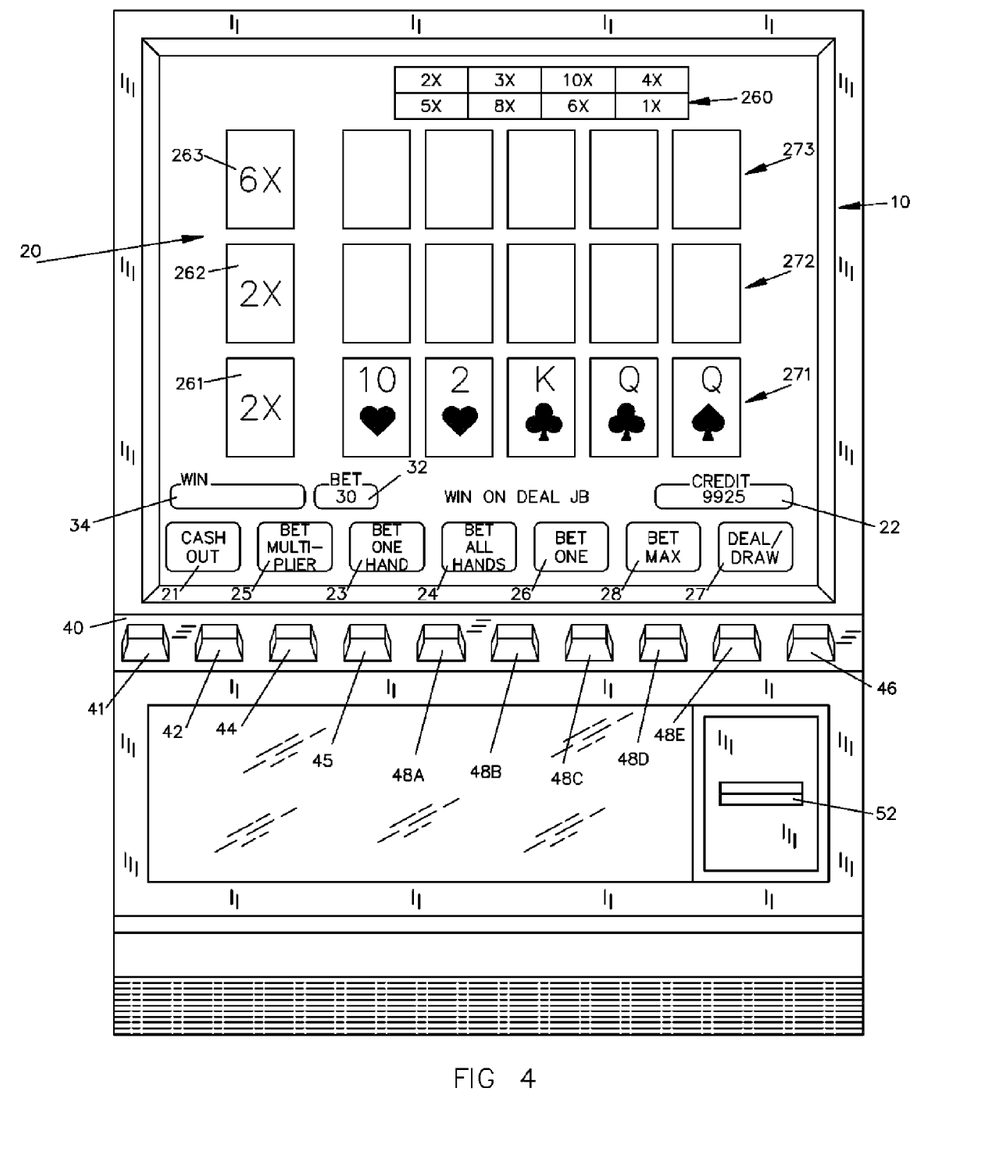
FIG. 4 shows a video poker machine configured to practice Version 2 of the present invention showing a representative initial deal of the cards of a multiple hand poker game.

As shown in FIG. 4 in this example, a player has made a thirty credit wager shown in the "BET" location 32. This activates three pay lines: five credits are allocated as the amount wagered on each pay line and five credits are required for the multiplier feature on each pay line.

A multiplier indicator 260 is provided on the video screen display 20. In a preferred embodiment of the present invention, an illuminating effect could randomly flash through the various multipliers show in the multiplier indicator 60 and wherever the illuminating effect stopped, that particular multiplier would be selected for an active pay line.

Version 2 requires that the player achieve an initial starting hand having a poker hand ranking of a Pair of Jacks or Better or higher in order for the multiplier feature to be used in the play of the hand. If the initial starting hand has a poker hand ranking of less than a Pair of Jacks or Better, then each activated pay line will have a multiplier of 1×.

The poker game shown in FIG. 4 as an example is a three hand poker game played in accordance with the method disclosed in U.S. Pat. No. 5,873,823. The player has been dealt an initial starting first HAND 271 of the Ten of Hearts, Two of Hearts, King of Clubs, Queen of Clubs and Queen of Spades.

Since the initial starting hand 271 has a poker hand ranking of a Pair of Jacks or Better, the multiplier feature is used on the play of this hand.

The player has selected to hold the Queen of Clubs and the Queen of Spades and these two cards are duplicated into second HAND 272 and third HAND 273.

The multiplier selection device is activated and a multiplier from the group of multipliers being used as shown at 260 is randomly selected and applied to each hand that has been activated for a multiplier by the extra wager. As shown in this example in FIG. 4, first HAND 271 has a 2× multiplier, second HAND 272 has a 2× multiplier and third HAND 273 has a 6× multiplier.

Figure 5:
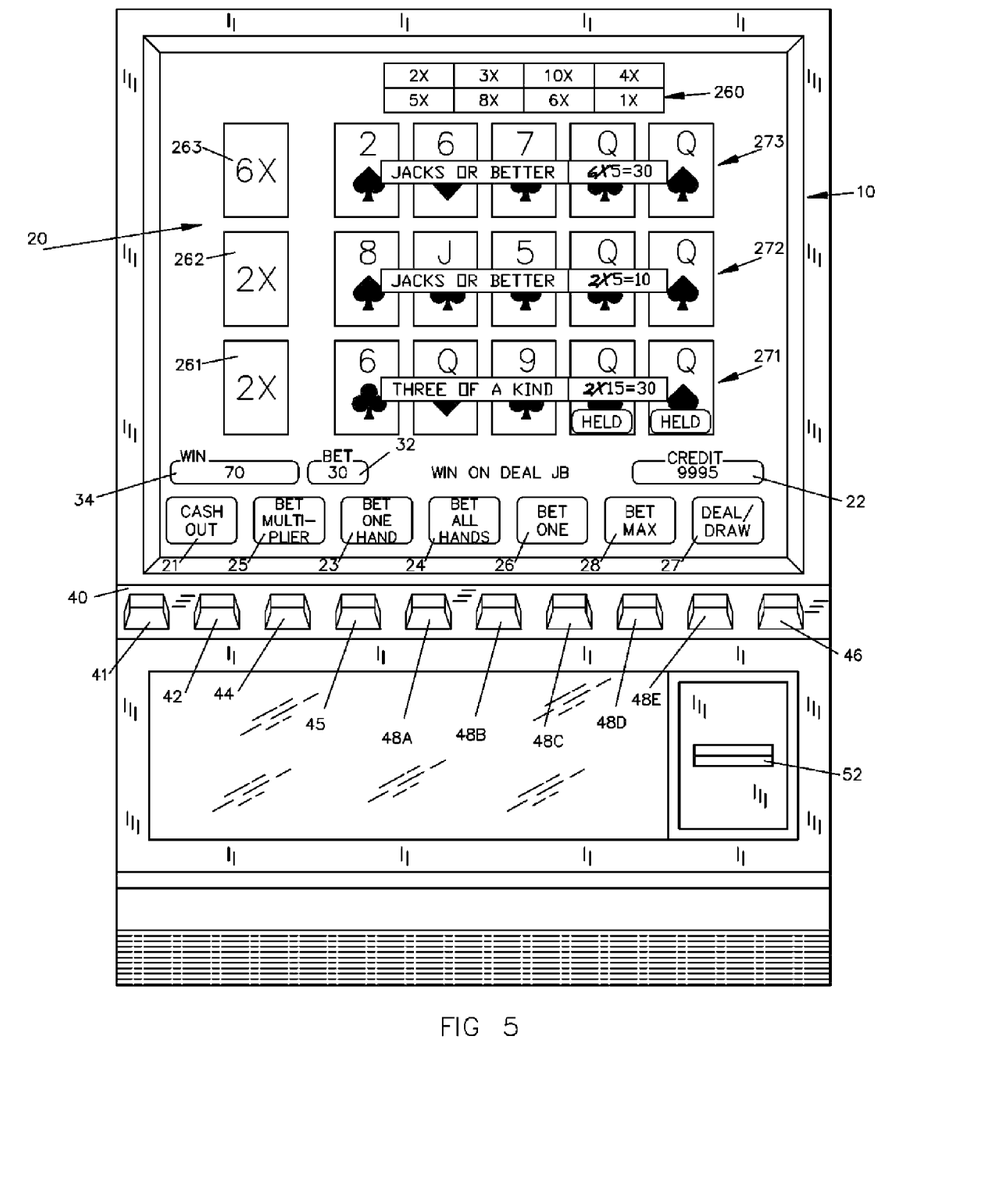
FIG. 5 shows a video poker machine configured to practice Version 2 of the present invention showing a representative display of the final hands of a multiple hand poker game.

As shown in FIG. 5, replacement cards for the discarded cards of first HAND 271 are displayed and the final first HAND 271 has a poker hand ranking of Three Queens. Additional cards are displayed into second HAND 272 and the final second HAND 272 has a poker hand ranking of a Pair of Queens. Additional cards are displayed into third HAND 273 and the final third HAND 273 has a poker hand ranking of a Pair of Queens.

In the example shown in FIGS. 4 and 5, a Double Double Bonus draw poker game format is used. Various pay tables may be used for this Double Double Bonus draw poker format. A suitable pay table for this format is shown in Table 2:

TABLE 2

| DOUBLE DOUBLE BONUS DRAW POKER | NUMBER OF COINS BET | | | | |
|---|---|---|---|---|---|
| POKER HAND CATEGORY | 1 | 2 | 3 | 4 | 5 |
| ROYAL FLUSH | 250 | 500 | 750 | 1000 | 4000 |
| STRAIGHT FLUSH | 50 | 100 | 150 | 200 | 250 |
| FOUR ACES WITH ANY 2, 3, 4 | 400 | 800 | 1200 | 1600 | 2000 |
| FOUR 2, 3, 4 WITH ANY 2, 3, 4 | 160 | 320 | 480 | 640 | 800 |
| FOUR ACES | 160 | 320 | 480 | 640 | 800 |
| FOUR 2, 3, 4 | 80 | 160 | 240 | 320 | 400 |
| FOUR KINGS THRU FIVES | 50 | 100 | 150 | 200 | 250 |
| FULL HOUSE | 9 | 18 | 27 | 36 | 45 |
| FLUSH | 6 | 12 | 18 | 24 | 30 |
| STRAIGHT | 4 | 8 | 12 | 16 | 20 |
| THREE-OF-A-KIND | 3 | 6 | 9 | 12 | 15 |
| TWO PAIR | 2 | 4 | 6 | 8 | 10 |
| JACKS OR BETTER | 1 | 2 | 3 | 4 | 5 |

Using the pay table shown in Table 2, final first HAND 271 is a winning combination of Three-of-a-Kind and the player would receive thirty credits as a payout based on the 2× multiplier 261. Final second HAND 272 is a winning combination of a Pair Jacks or Better and the player would receive ten credits as a payout based on the 6× multiplier 262. Final third HAND 273 is a winning combination of a Pair of Jacks or Better and the player would receive thirty credits as a payout based on the 6× multiplier 263.

Version 3

The method of Version 3 of the present invention will now be described. In this version, the predetermined arrangement of cards in the first initial hand must have a poker hand ranking a poker hand ranking of a Pair of Twos, Threes, Fours, Five or Sixes or a Pair of Jacks or Better or higher to trigger the multiplier feature.

Figure 6:
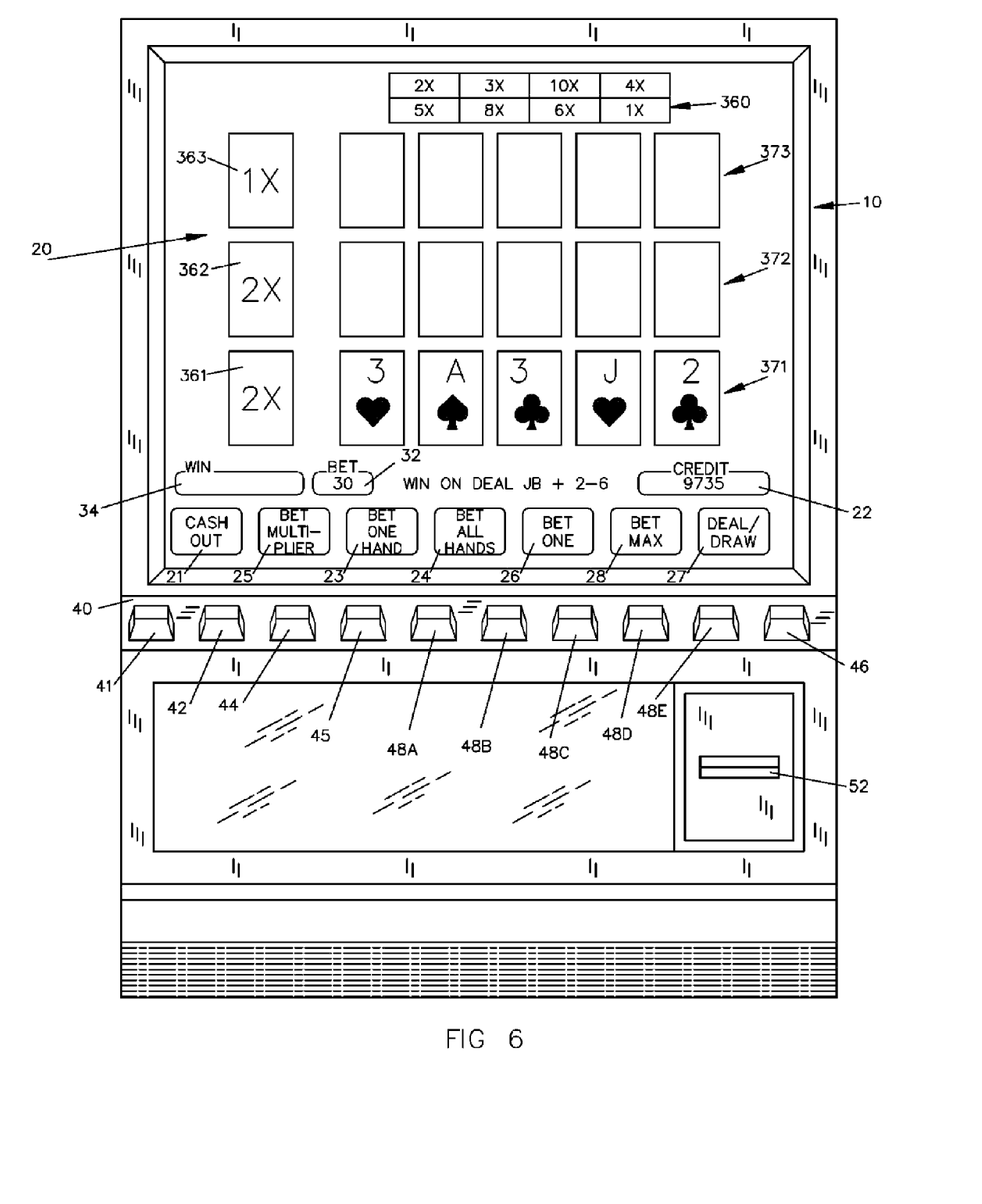
FIG. 6 shows a video poker machine configured to practice Version 3 of the present invention showing a representative initial deal of the cards of a multiple hand poker game.

As shown in FIG. 6 in this example, a player has made a thirty credit wager shown in the "BET" location 32. This activates three pay lines: five credits are allocated as the amount wagered on each pay line and five credits are required for the multiplier feature on each pay line. A multiplier indicator 360 is provided on the video screen display 20. Version 3 requires that the player achieve an initial starting hand having a poker hand ranking of a Pair of Jacks or Better or higher or a Pair of Twos through Sixes in order for the multiplier feature to be used in the play of the hand. If the initial starting hand has a poker hand ranking of less than a Pair of Jacks or Better and does not have a Pair of Twos through Sixes, then each activated pay line will have a multiplier of 1×.

The poker game shown in FIG. 6 as an example is a three hand poker game played in accordance with the method disclosed in U.S. Pat. No. 5,873,823. The player has been dealt an initial starting first HAND 371 of the Three of Hearts, Ace of Spades, Three of Clubs, Jack of Hearts and Two of Clubs.

Since the initial starting hand 271 has a poker hand ranking of a Pair of Threes, the multiplier feature is used on the play of this hand. The multiplier selection device is activated and first HAND 371 receives a 2× multiplier 361, second HAND 372 receives a 2× multiplier 362 and third HAND 373 receives a 1× multiplier 363.

Figure 7:
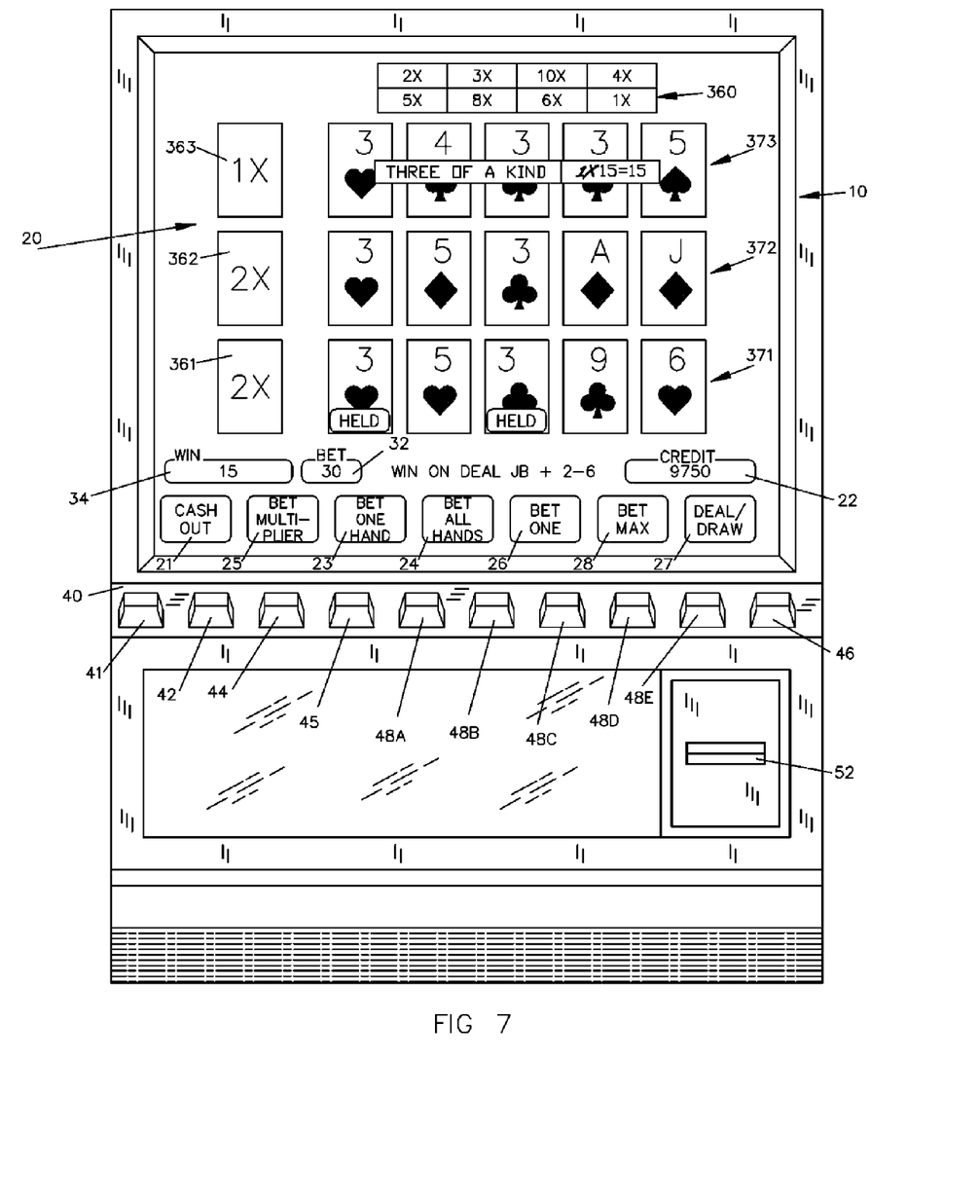
FIG. 7 shows a video poker machine configured to practice Version 3 of the present invention showing a representative display of the final hands of a multiple hand poker game.

As shown in FIG. 7, the player has selected to hold the Three of Hearts and the Three of Clubs and these two cards are duplicated into second HAND 372 and third HAND 373.

As shown in FIG. 7, replacement cards for the discarded cards of first HAND 271 are displayed and the final first HAND 371 has a poker hand ranking of less than Jacks or Better. Additional cards are displayed into second HAND 372 and the final second HAND 372 has a poker hand ranking of less than Jacks of Better. Additional cards are displayed into third HAND 373 and the final third HAND 373 has a poker hand ranking of Three-of-a-Kind.

In the example shown in FIGS. 6 and 7, a Double Double Bonus draw poker game format is used, such as the one shown in Table 2.

Using the pay table shown in Table 2, final first HAND 371 is a losing combination and the player receives no payout. Final second HAND 372 is also a losing combination and the player receives no payout. Final third HAND 373 is a winning combination of Three-of-a-Kind and the player would receive fifteen credits as a payout based on the 1× multiplier 363.

Version 4

The method of Version 4 of the present invention will now be described. In this version, the player must achieve an initial starting hand having a poker hand ranking of any Pair or higher to trigger the multiplier feature.

Figure 8:
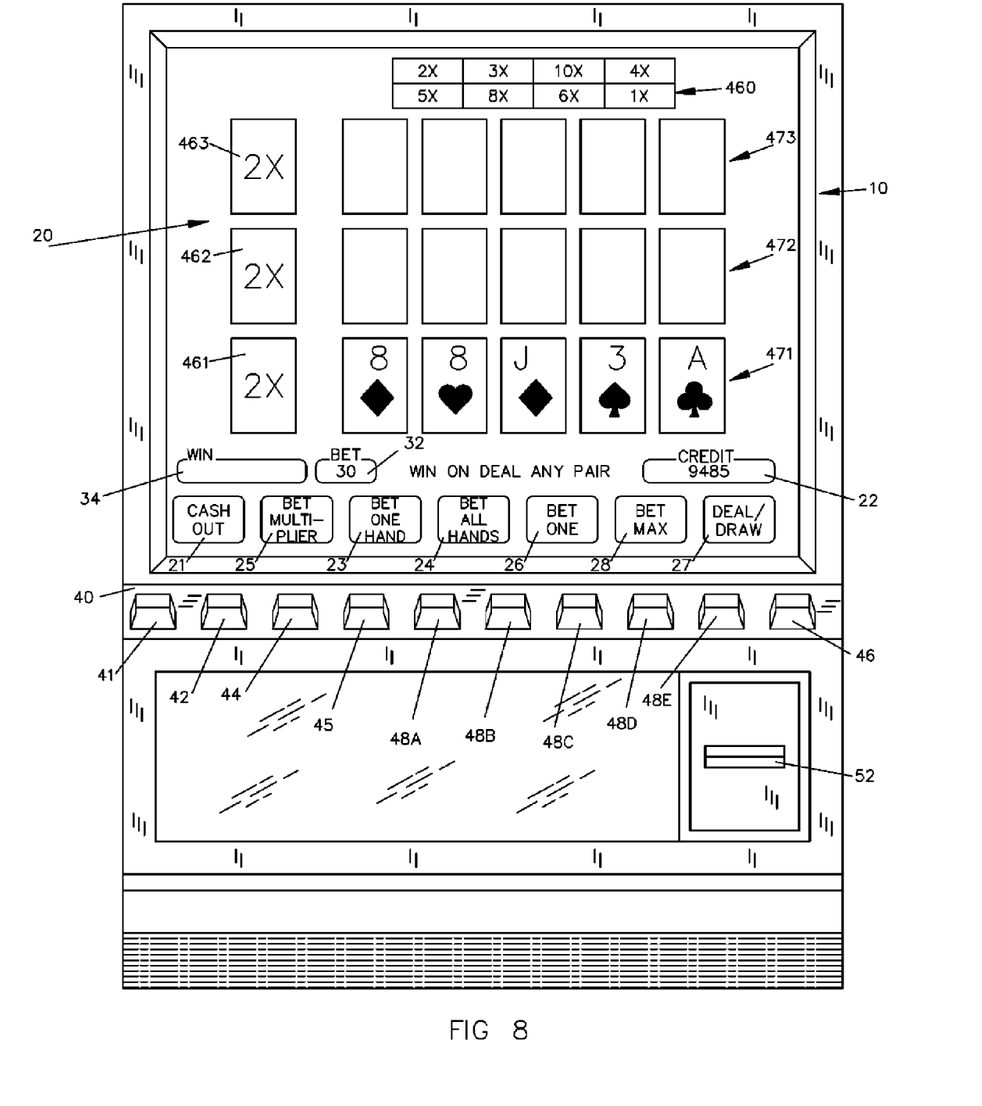
FIG. 8 shows a video poker machine configured to practice Version 4 of the present invention showing a representative initial deal of the cards of a multiple hand poker game.

As shown in FIG. 8 in this example, a player has made a thirty credit wager shown in the "BET" location 32. This activates three pay lines: five credits are allocated as the amount wagered on each pay line and five credits are required for the multiplier feature on each pay line. A multiplier indicator 460 is provided on the video screen display 20. Version 4 requires that the player achieve an initial starting hand having a poker hand ranking of any Pair or higher in order for the multiplier feature to be used in the play of the hand. If the initial starting hand has a poker hand ranking of less than any Pair, then each activated pay line will have a multiplier of 1×.

The poker game shown in FIG. 8 as an example is a three hand poker game played in accordance with the method disclosed in U.S. Pat. No. 5,873,823. The player has been dealt an initial starting first HAND 471 of the Eight of Diamonds, Eight of Hearts, Jack of Diamonds, Three of Spades and Ace of Clubs.

Since the initial starting hand 271 has a poker hand ranking of a Pair of Eights, the multiplier feature is used on the play of this hand. The multiplier selection device is activated and first HAND 471 receives a 2× multiplier 461, second HAND 472 receives a 2× multiplier 462 and third HAND 473 receives a 1× multiplier 463.

Figure 9:
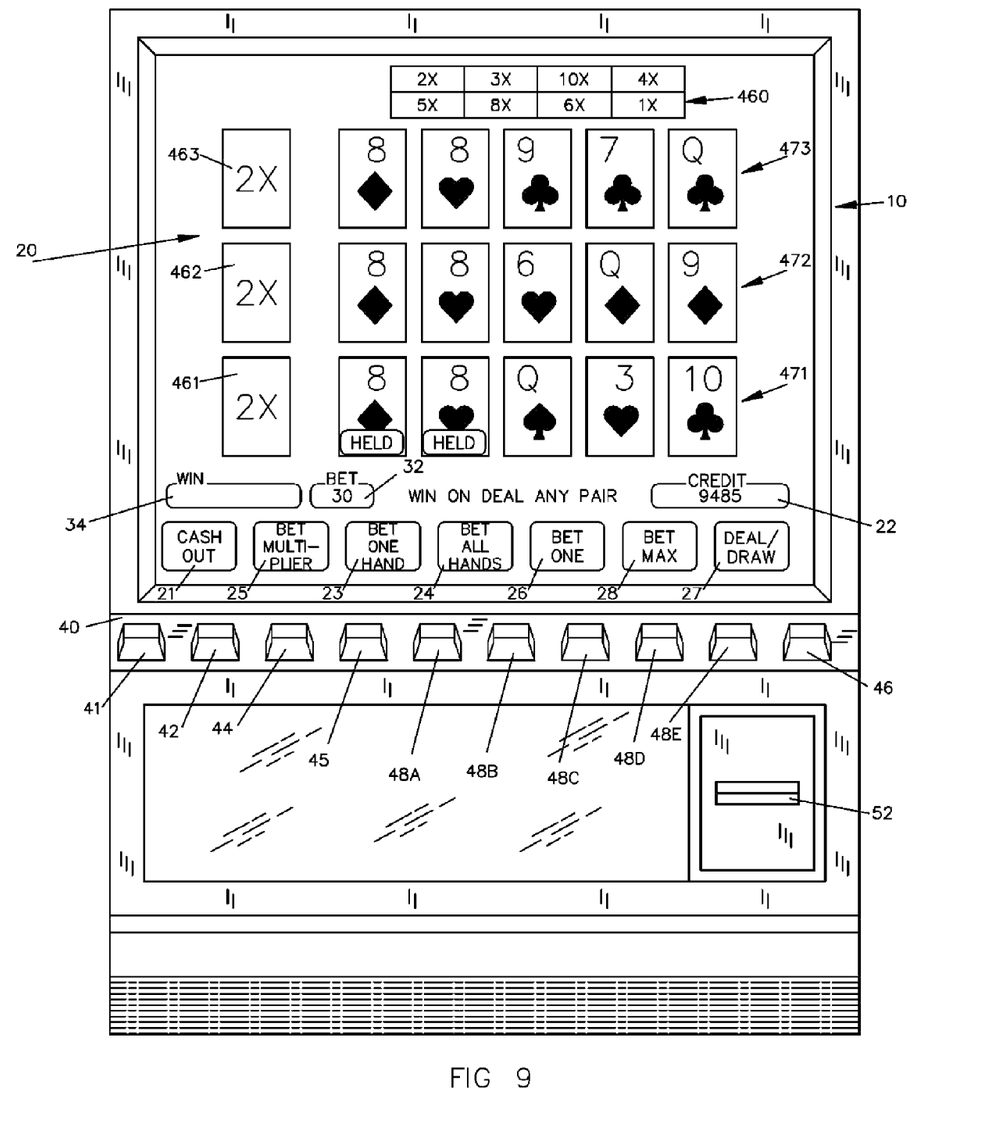
FIG. 9 shows a video poker machine configured to practice Version 4 of the present invention showing a representative display of the final hands of a multiple hand poker game.

As shown in FIG. 9, the player has selected to hold the Three of Hearts and the Three of Clubs and these two cards are duplicated into second HAND 372 and third HAND 373.

As shown in FIG. 9, replacement cards for the discarded cards of first HAND 471 are displayed and the final first HAND 471 has a poker hand ranking of less than Jacks or Better. Additional cards are displayed into second HAND 472 and the final second HAND 472 has a poker hand ranking of less than Jacks of Better. Additional cards are displayed into third HAND 473 and the final third HAND 473 has a poker hand ranking of less than Jacks of Better.

In the example shown in FIGS. 8 and 9, a Double Double Bonus draw poker game format is used, such as the one shown in Table 2.

Using the pay table shown in Table 2, final first HAND 371 is a losing combination and the player receives no payout. Final second HAND 372 is also a losing combination and the player receives no payout. Final third HAND 373 is also a losing combination and the player receives no payout.

Figure 10:
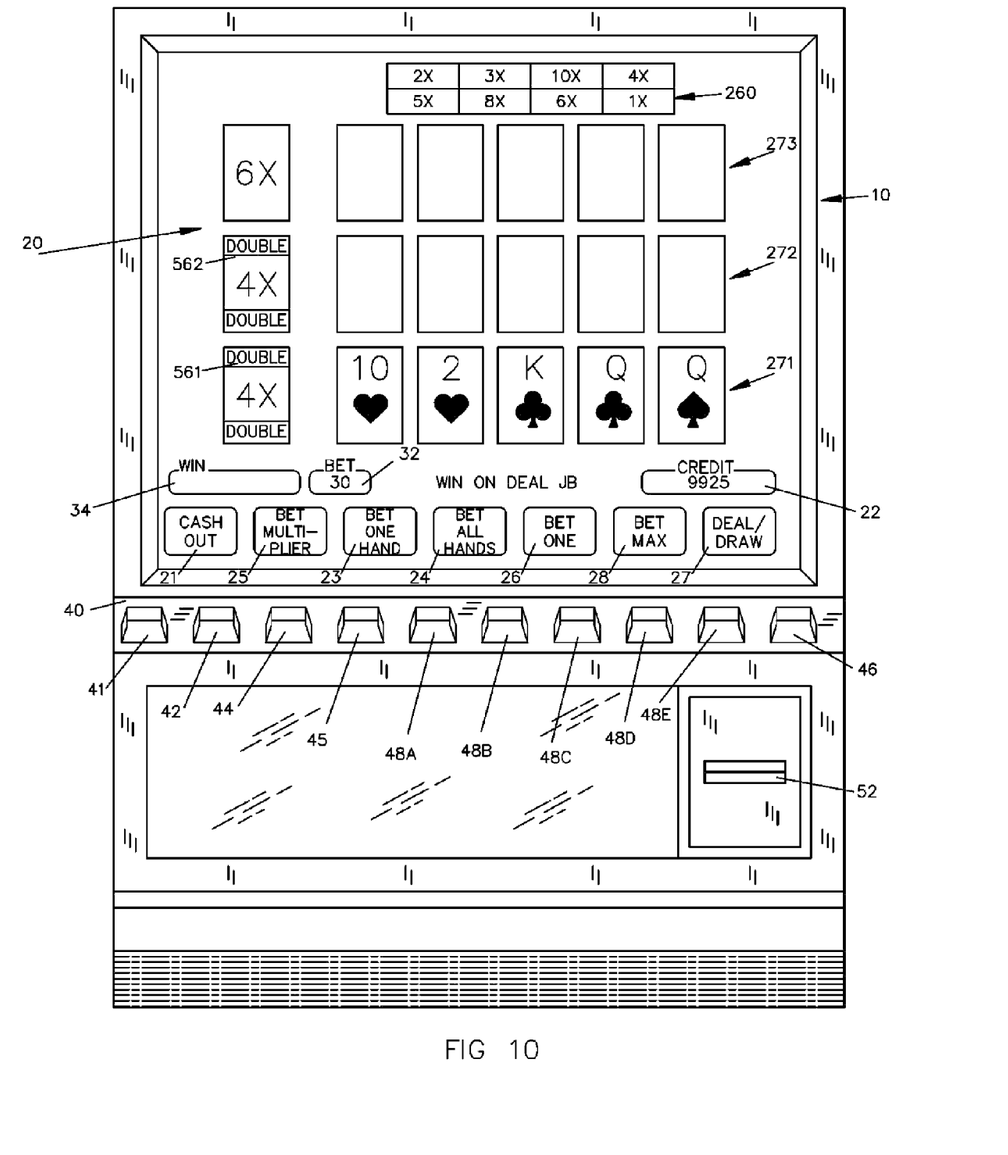
FIG. 10 shows a video poker machine having a double match multiplier.

Another variation of any of the versions discussed herein would double the multiplier whenever two multipliers of the same value occur during the play of a hand. For example, in FIG. 4, there are two 2× multipliers that have been selected by the multiplier selection device. Applying this variation, each of these 2× multipliers would be increased to 4× multipliers as shown in FIG. 10 in which the first HAND 271 has a 4× multiplier 561 and the second HAND 272 has a 4× multiplier 562.

In a preferred embodiment of any of the versions discussed herein, a player must make an extra wager to be eligible for the multiplier feature. The amount of the extra wager could also be more or less than five credits and relates to the frequency and amount of the multipliers applied to the various pay lines. The use of an extra wager allows for higher payouts when the multiplier feature is activated. Alternatively, no extra wager could be required for the multiplier feature, but the pay table would have to be adjusted for the increased payouts that would come from the multiplier feature.

In all of the versions discussed herein, any other suitable multiplier random selection device could be used, such as a spinning wheel or a spinning reel. Depending on the multiplier random selection device being used, a multiplier indicator may or may not be displayed on the video screen display 20. The multipliers may be any suitable group of multipliers based on the mathematics of the game. The group of various multipliers may include two or more multipliers in integer format. The various integers may be weighted for selection with lower value integers having a higher probability of being chosen and would be selected more often than the higher value multipliers. Any suitable method of selecting a multiplier in a random manner may be used. It is also possible to use multipliers that have a non-integer value such as 2.5×.

Any of the version can be applied to any of the various video poker formats discussed above.

The present invention can be applied to any type of poker game that has multiple pay lines.

The present invention can also be applied to stud poker games and slot machine games or any other casino game that has multiple pay lines.

The invention is claimed as follows:

1. A video poker machine comprising:
a housing;
a plurality of input devices supported by the housing, the plurality of input devices including an acceptor;
at least one display device supported by the housing;
at least one processor; and
at least one memory device that stores a plurality of instructions that, when executed by the at least one processor, cause the at least one processor to operate with the at least one display device and the plurality of input devices to:
(a) establish a credit balance based at least in part on a monetary value associated with a physical item after the physical item is received by the acceptor;
(b) place a wager on a play of a card game after an actuation of a wager button is received, the credit balance being decreasable by the wager, the card game associated with a plurality of paylines;
(c) activate one or more of the paylines based on the wager;
(d) for a first active payline, randomly determine and display face-up a first hand including a plurality of cards;
(e) if the first hand satisfies a multiplier condition, for each active payline, randomly determine a multiplier from a set of a plurality of different multipliers and associate said randomly-determined multiplier with said active payline;
(f) enable selection of none, one, a plurality, or all of the cards of the first hand to be held;
(g) for each of any additional active paylines, display one or more additional hands each including each of any held cards of the first hand;
(h) if all of the cards of the first hand are held, designate each hand as complete;
(i) if fewer than all of the cards of the first hand are held:
(1) discard each non-held card of the first hand;
(2) complete the first hand by, for each discarded card of the first hand, randomly selecting a card and replacing said discarded card with the randomly-selected card; and
(3) for each of any additional active paylines, complete the additional hand associated with said active payline such that the additional hand includes the same quantity of cards as the first hand;
(j) for each active payline, determine any awards for the complete hand associated with said active payline based at least in part on any multiplier associated with said active payline, the credit balance being increasable by any determined awards; and
(k) initiate a payout associated with the credit balance after an actuation of a cashout button is received.

2. The video poker machine of claim 1, wherein the multiplier condition is satisfied when the first hand includes a designated combination of cards.

3. The video poker machine of claim 1, wherein the multiplier condition is satisfied when the first hand has a designated poker hand ranking.

4. The video poker machine of claim 1, wherein the multiplier condition is satisfied when the first hand has one of a plurality of different designated poker hand rankings.

5. The video poker machine of claim 1, wherein the multiplier condition is satisfied when the first hand has a poker hand ranking of at least a designated value.

6. The video poker machine of claim 1, wherein the plurality of instructions, when executed by the at least one processor, cause the at least one processor to provide (e) if the wager is a designated wager.

7. The video poker machine of claim 1, wherein the plurality of instructions, when executed by the at least one processor, cause the at least one processor to randomly determine the cards of the first hand from a set of a plurality of cards.

8. The video poker machine of claim 7, wherein the plurality of instructions, when executed by the at least one processor, cause the at least one processor to, if fewer than all of the cards of the first hand are held, complete the first hand by, for each discarded card of the first hand, randomly selecting one of the remaining cards of the set of the plurality of cards and replacing said discarded card with the randomly-selected card.

9. The video poker machine of claim 8, wherein the plurality of instructions, when executed by the at least one processor, cause the at least one processor to, if fewer than all of the cards of the first hand are held, for each of any additional active paylines, complete the additional hand associated with said active payline by randomly selecting one or more of cards and adding said one or more randomly-selected cards to said additional hand, wherein if the one or more additional hands include a plurality of additional hands, the one or more cards added to the additional hands are randomly selected from different card sets.

10. A method of operating a video poker machine, said method comprising:
   (a) establishing, by at least one processor, a credit balance based at least in part on a monetary value associated with a physical item after the physical item is received by an acceptor of the video poker machine;
   (b) placing, by the at least one processor, a wager on a play of a card game after an actuation of a wager button is received, the credit balance being decreasable by the wager, the card game associated with a plurality of paylines;
   (c) activating, by the at least one processor, one or more of the paylines based on the wager;
   (d) for a first active payline, randomly determining, by the at least one processor, and displaying face-up, by at least one display device, a first hand including a plurality of cards;
   (e) if the first hand satisfies a multiplier condition, for each active payline, randomly determining, by the at least one processor, a multiplier from a set of a plurality of different multipliers and associating, by the at least one processor, said randomly-determined multiplier with said active payline;
   (f) enabling selection of none, one, a plurality, or all of the cards of the first hand to be held;
   (g) for each of any additional active paylines, displaying, by the at least one display device, one or more additional hands each including each of any held cards of the first hand;
   (h) if all of the cards of the first hand are held, designating, by the at least one processor, each hand as complete;
   (i) if fewer than all of the cards of the first hand are held:
      (1) discarding, by the at least one processor, each non-held card of the first hand;
      (2) completing, by the at least one processor, the first hand by, for each discarded card of the first hand, randomly selecting a card and replacing said discarded card with the randomly-selected card; and
      (3) for each of any additional active paylines, completing, by the at least one processor, the additional hand associated with said active payline such that the additional hand includes the same quantity of cards as the first hand;
   (j) for each active payline, determining, by the at least one processor, any awards for the complete hand associated with said active payline based at least in part on any multiplier associated with said active payline, the credit balance being increasable by any determined awards; and
   (k) initiating, by the at least one processor, a payout associated with the credit balance after an actuation of a cashout button is received.

11. The method of claim 10, wherein the multiplier condition is satisfied when the first hand includes a designated combination of cards.

12. The method of claim 10, wherein the multiplier condition is satisfied when the first hand has a designated poker hand ranking.

13. The method of claim 10, wherein the multiplier condition is satisfied when the first hand has one of a plurality of different designated poker hand rankings.

14. The method of claim 10, wherein the multiplier condition is satisfied when the first hand has a poker hand ranking of at least a designated value.

15. The method of claim 10, which includes providing (e) if the wager is a designated wager.

16. The method of claim 10, which includes randomly determining, by the at least one processor, the cards of the first hand from a set of a plurality of cards.

17. The method of claim 16, which includes, if fewer than all of the cards of the first hand are held, completing, by the at least one processor, the first hand by, for each discarded card of the first hand, randomly selecting one of the remaining cards of the set of the plurality of cards and replacing said discarded card with the randomly-selected card.

18. The method of claim 17, which includes, if fewer than all of the cards of the first hand are held, for each of any additional active paylines, completing, by the at least one processor, the additional hand associated with said active payline by randomly selecting one or more of cards and adding said one or more randomly-selected cards to said additional hand, wherein if the one or more additional hands include a plurality of additional hands, the one or more cards added to the additional hands are randomly selected from different card sets.

19. The method of claim 10, which is at least partially provided through a data network.

20. The method of claim 19, wherein the data network is an internet.

* * * * *